Dec. 25, 1945.    J. GALAMB ET AL    2,391,408
VEHICLE HEATER
Filed Jan. 29, 1944    2 Sheets-Sheet 2

J. Galamb
T. L. Hibbard
INVENTOR.

BY Edwin C. McRae
R. G. Harris
Attorneys.

Patented Dec. 25, 1945

2,391,408

UNITED STATES PATENT OFFICE 2,391,408

VEHICLE HEATER

Joseph Galamb, Detroit, and Thomas L. Hibbard, Birmingham, Mich., assignors to Ford Motor Company, Dearborn, Mich., a corporation of Delaware Application January 29, 1944, Serial No. 520,368

2 Claims. (Cl. 98—2)

This invention relates to forced draft ventilation system; and, more particularly, to a heater and its mode of installation in a motor vehicle.

The purpose of the present invention is to devise an installation for a forced draft heater unit of adequate capacity which will not restrict the available passenger room in the vehicle. Another purpose of the invention is to devise an installation by which heat can be conveyed from the heater to both front and rear seat areas of a vehicle without recourse to expensive and cumbersome duct work. Still another purpose of the invention is to devise an installation providing for a balanced supply of fresh and recirculated air to the heater so the atmosphere in the car at all times may be carefully controlled and adequate fresh air introduced.

An advantage of the present invention is that by utilizing certain structural spaces, which otherwise are unused in the conventional motor vehicle, a large heating unit of adequate capacity may be installed without infringing upon the room required by the passengers or for the operation of the vehicle. Following this, the utilization of other normally waste space within the door members of the vehicle as duct work permits direct transfer of heated air to all parts of the car without resorting to the conduits used in connection with the typical under seat heater unit. A further advantage is that as all components of the heating system are carefully protected within the body of the vehicle itself, they are less subject to wear and deterioration and may, particularly in the case of the duct work, be fabricated from less expensive material than has heretofore been required. At the same time, all components of the heater itself are readily accessible for maintenance or repair and the operation of the unit is subject to precise control in the interest of passenger comfort and a continuous supply of fresh air.

With these and other objects in view, the invention consists in the arrangement, construction, and combination of the various parts of the improved device, as described in the specification, claimed in the claims and illustrated in the accompanying drawings, in which:

Figure 3 is a sectional plan view showing the details of the vehicle door construction and taken substantially as indicated by the line 3—3 on Figure 1.

Figure 4 is a vertical section through the lower part of the door showing a modified construction.

Figure 1:
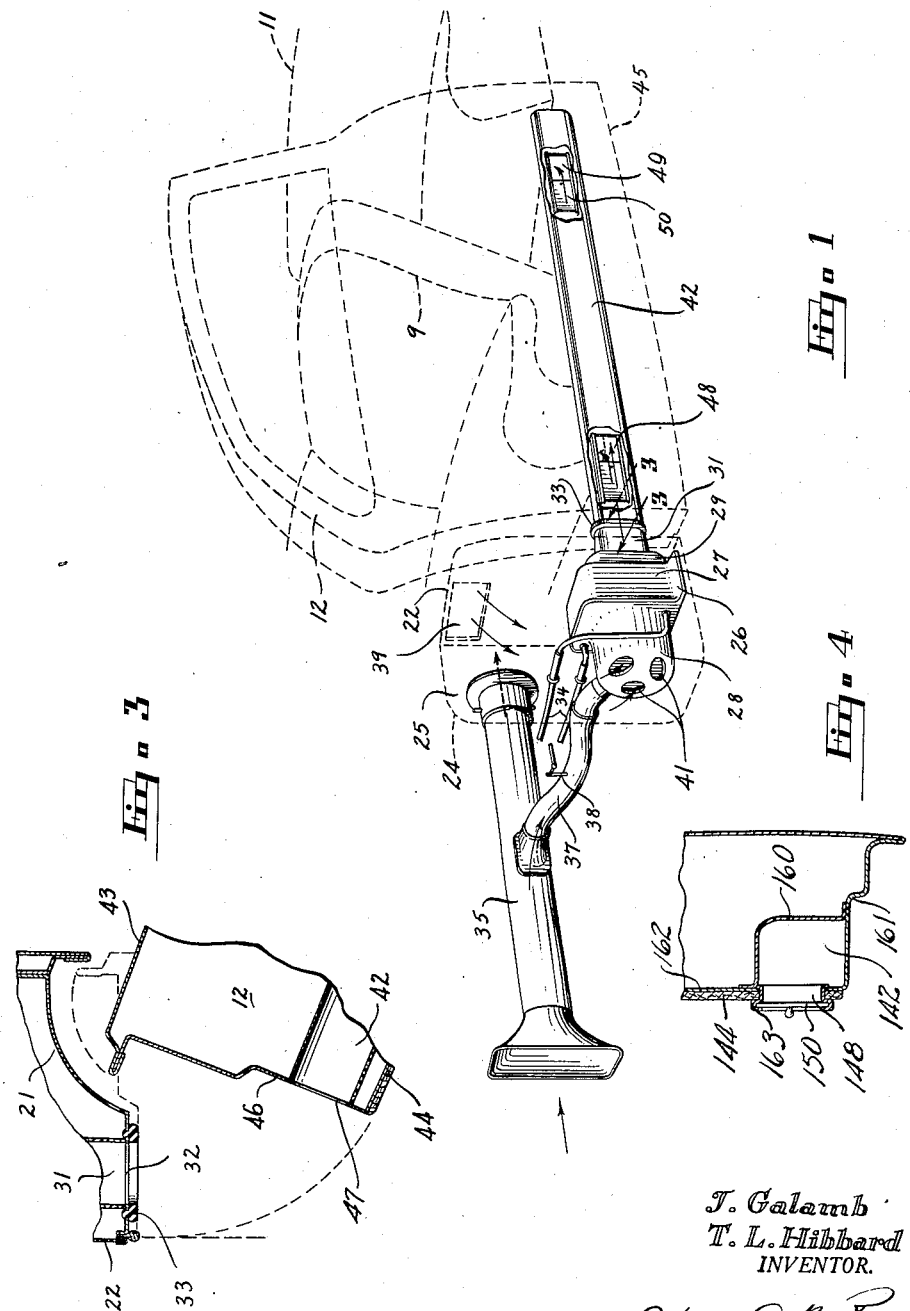
Figure 1 is a perspective view of the heater assembly, the associated parts of the vehicle construction proper being shown in phantom.
Figure 2:
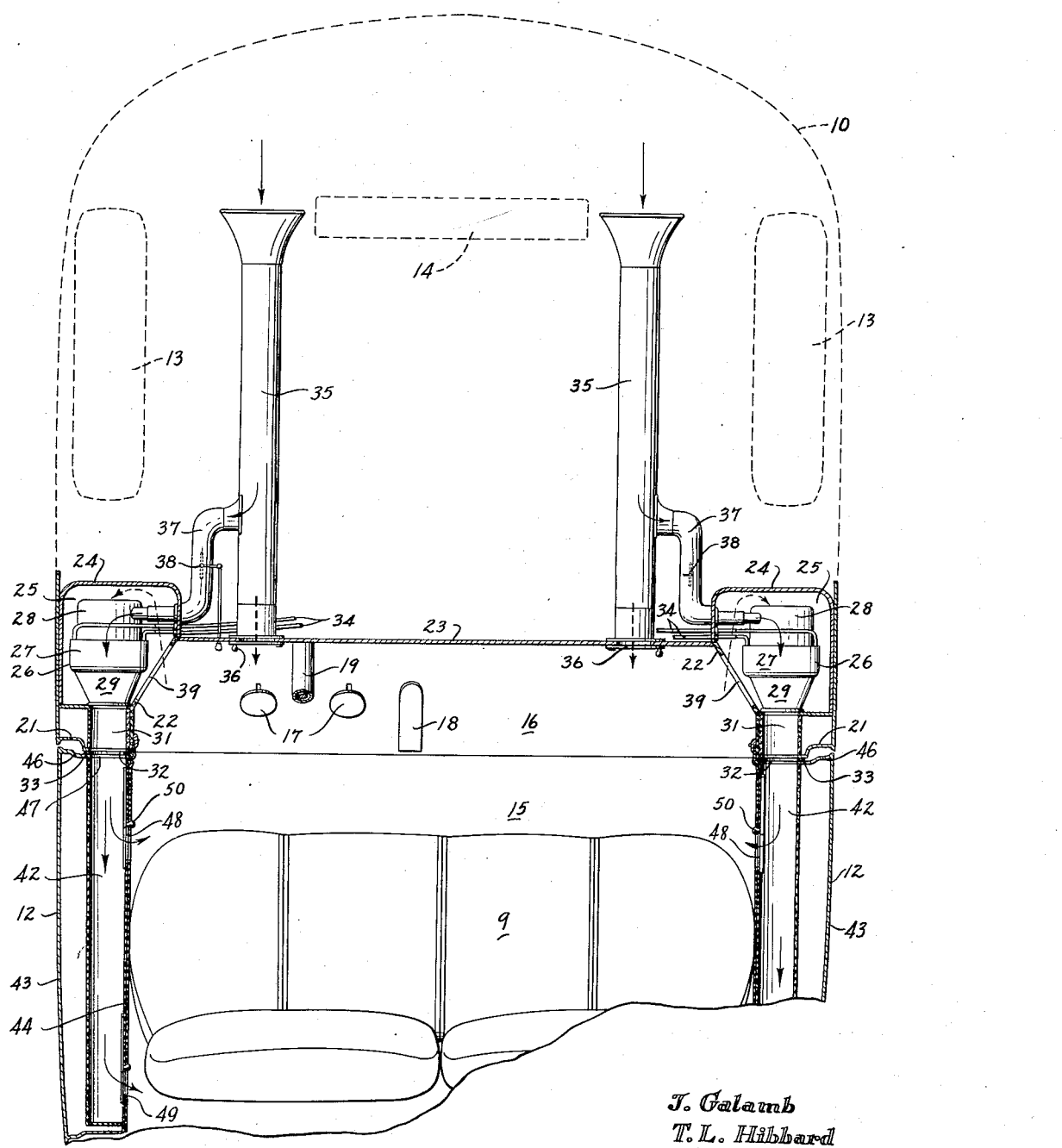
Figure 2 is a partial plan view of the vehicle having the heater construction, certain associated parts of the vehicle being shown in phantom.

Referring to Figures 1 and 2, motor vehicle 10 is shown having front seat 9, door 12 and rear seat 11 (the construction illustrated is of the Tudor type), front wheels 13 and radiator 14. Following the usual practice, there is a floor 15 and associated toe board 16 through which project the clutch and brake pedals 17, accelerator 18 and steering column 19. The door 12 at its forward edge 46 abuts the pillar 21 to which it is hingedly secured (the hinge not being shown) and the cowl trim panel 22 extends forwardly from the pillar 21 to the dash 23. A metal shell 24 forwardly of the trim panel 22 and the pillar 21 forms a heater chamber 25 closed to the engine compartment in which is located a hot water heater 26 of the usual construction having a radiator chamber 27, a fan chamber 28 enclosing the fan impelling the forced draft, and a delivery duct 29 which communicates with a conduit 31, preferably formed of fiber board, which passes through the pillar 21 and is secured at its rear face 32 where it is surrounded by a gasket formed of rubber or other flexible material 33. The hot water heater 26 is supplied with water from the engine cooling system through the pipes 34 attached to the water jacket preferably including a thermostatic control.

Air is supplied through the heater chamber 25 for subsequent circulation through the vehicle from two sources. Fresh air is forced, by reason of the vehicle's forward movement, through the main duct 35 which extends forwardly on either side of the vehicle's engine from the dash 23 to a point adjacent the radiator 14. The damper control 36 is provided on the dash so that fresh air can be admitted through these ducts directly to the interior of the vehicle independent of heater operation. An auxiliary duct 37 from the main duct 35 enters the heating chamber 25 and makes a direct connection with the fan chamber 28 of the hot water heater 26. A damper 38 is provided in the auxiliary duct 37 so that ingress of fresh air to the heater may be adjusted or may be shut off entirely when the heater is not in operation. Fresh air will be drawn into the heater whether the vehicle is moving or stationary through the fan in chamber 28. The second source of air is through apertures 39 in the cowl trim panel 22 by means of which air is drawn from the interior of the vehicle into the heater chamber 25 and propelled through the hot water heater 26 entering the latter through the ports 41 communicating with the fan chamber 28. It is thus apparent that provision is made for the recirculation of a certain proportion of air from the interior of the vehicle plus the addition of fresh air from the exterior, the amount of the latter being regulated to suit particular circumstances by operation of the dampers 38 or 36. In addition, the conventional defroster connections may be made.

The distribution of the heated air from the heater 26 throughout the car is obtained by means of hot air conduits 42, preferably formed of a fiber board material, and located within the door 12 of the vehicle—that is between the door panel 43 and the door trim 44 and adjacent the lower edge 45 of the door. These hot air conduits 42 are secured in an aperture 47 formed in the forward edge 46 of the door in a position to cooperate with the corresponding conduits 31 mounted in the rear face 32 of the pillar and effecting a sealed connection between the two when the door is closed through the medium of the gasket 33. Hot air outlets 48 and 49 are formed in the walls of the hot air conduits 42 and the door trim 44 and serve to direct heated air to the interior of the vehicle in the front and rear passenger compartments, respectively. These outlets are equipped with sliding dampers 50 so it is possible to adjust the flow of warm air provided to any part of the car.

In the modified construction of Figure 4, the conduit 142 is formed by welding an L shaped strip of metal 160 to the base 161 and inner wall 162 of the door 112. The hot air outlet 148 has the sliding damper 150 mounted in the rim 163 which secures the rim in place as well as maintaining the door trim 144 in proper position.

While this construction has particular utility when applied to Tudor or coach models in which one door serves both the front and rear passenger compartments, it may be applied to the Fordor sedan or even the conventional coupé for better heat distribution. However, in the first instance, as both of the passenger compartments, front and rear, are served from the same ducts, a complete circulation of heated air is assured. Both the heater and duct work conveying the heated air are located in the body spaces which are otherwise unused so that the available passenger room is not reduced. At the same time the necessary heat conduits, water pipes and electrical connections are held to a minimum length and do not interfere with any other function of the vehicle. The heater and the distributing system are sealed from the odors or gases originating in the engine compartment or outside the passenger space which is both a comfort and a safety factor. Additional flexibility is obtained through the interconnection of the heater supply auxiliary ducts 37 with the main ducts 35 so that the temperature and freshness of the air is subject to instant control. At the same time, the main duct is still available for its principal function which is the supply of large quantities of air for cooling the interior of the vehicle during the warm seasons of the year.

The prime advantage of the arrangement from a manufacturing standpoint is that as the hot air duct work is entirely protected by the cowling and pillar or door panel and door trim, as the case may be, it is possible to use much less expensive materials in their fabrication. Referring to the conventional rear seat heater arrangement in which a duct is located beneath the floor of the vehicle, metallic construction is imperative to obtain the strength necessary to withstand vibration or the stresses imposed when the wheels pick up stones from the road and project them towards the vehicle's floor. However, it is usually necessary that the duct be flexible since it must wind between or around frame members, the torque tube, springs, connections, etc. Of course, the duct is unprotected against dust, water or mud and suffers rapid deterioration from them. Thus, the duct work is expensive to make, cumbersome to install and deteriorates rapidly in use. So-called under-seat heaters—while diminishing duct work—have equally serious disadvantages. The water supply pipes are over-extended and it is difficult to get fresh air to the heater. Worse, recirculated air enters the heater at floor level and entrains with it whatever dirt and dust are to be found in the vicinity. Here, where such duct work extends only through protected areas, the duct need not be shock resistant, flexible or particularly corrosion resistant. Thus, a fiber tube is adequate for all purposes. Heat is admitted uniformly to the front and bottom passenger areas at floor level—where it should be—and air for recirculation is picked up well above floor level where it is at least moderately clean.

Some changes may be made in the apparatus described without departing from the spirit of the invention, and it is the intention to cover by the claims such changes as may be reasonably included within the scope thereof.

The invention claimed is:

1. In a heater arrangement for motor vehicles, having an engine compartment, a passenger space, said compartment and space being separated by a toeboard and dashboard therebetween, a cowl over said dashboard and toeboard and terminating on either side in a door supporting pillar, a heater housing extending forwardly from the dashboard and toeboard and beneath said cowl and extending into but closed to said engine compartment, and separated from the passenger space by a panel extending between said pillar and said dashboard, a heater and fan means mounted within said heater housing, a port in said panel adjacent the top of said housing to admit air from the interior space of said vehicle thereto, an inlet in said housing to admit fresh air from the exterior of said vehicle to said housing and heater means, and a duct extending through said pillar from said housing for the delivery of warm air from said heater, and at least one outlet in said duct to discharge heated air from said duct into said passenger space.

2. In a heating arrangement for motor vehicles having an engine compartment and a passenger space, said compartment and space being separated by a toeboard and dashboard therebetween, said passenger space being divided between a front seat and a rear seat, a cowl over said dashboard and said toeboard and terminating on either side in a door-supporting pillar, a single door on each side having its forward edge hingedly secured to said pillar, said door extending rearwardly of said front seat to permit access to both seats, a heater chamber extending forwardly from the dashboard and toeboard and beneath said cowl and extending into but closed to said engine compartment, and separated from the passenger space by a panel extending between said pillar and said dashboard, a heat exchanger and fan means mounted in said heater chamber, a port in said chamber to admit fresh air from the exterior of said vehicle to said chamber, an inlet in said panel to admit air from the interior of said vehicle to said chamber, a conduit leading rearwardly from said heater chamber through said door-supporting pillar and terminating at an aperture in the rear face of said pillar, a cooperating aperture formed in the forward edge of said door, a duct in the interior of said door leading rearwardly from said co-operating aperture and having a closed rear end, means between the said apertures in said pillar and said door, effective when the door is in closed position, to provide a continuous passageway from said heater chamber to said duct, and outlets in said duct to discharge heated air from said duct into said passenger space forwardly and rearwardly of said front seat.

JOSEPH GALAMB.
THOMAS L. HIBBARD.